US012640107B2

(12) United States Patent
Sugiyama et al.

(10) Patent No.: US 12,640,107 B2
(45) Date of Patent: May 26, 2026

(54) ELECTRIC CURRENT CONTROL CIRCUIT, CONTROL DEVICE, AND DISPLAY DEVICE

(71) Applicants: SONY SEMICONDUCTOR SOLUTIONS CORPORATION, Kanagawa (JP); SONY GROUP CORPORATION, Tokyo (JP)

(72) Inventors: Takaaki Sugiyama, Kanagawa (JP); Keisuke Hirano, Kanagawa (JP); Hideki Akiyama, Tokyo (JP); Shogo Fukuda, Tokyo (JP)

(73) Assignees: SEMICONDUCTOR SOLUTIONS CORPORATION, Kanagawa (JP); SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/846,846

(22) PCT Filed: Feb. 9, 2023

(86) PCT No.: PCT/JP2023/004420
§ 371 (c)(1),
(2) Date: Sep. 13, 2024

(87) PCT Pub. No.: WO2023/181684
PCT Pub. Date: Sep. 28, 2023

(65) Prior Publication Data

US 2025/0201205 A1 Jun. 19, 2025

(30) Foreign Application Priority Data

Mar. 22, 2022 (JP) ................................. 2022-045967

(51) Int. Cl.
*G09G 3/34* (2006.01)
*G09G 3/20* (2006.01)

(52) U.S. Cl.
CPC ......... *G09G 3/3426* (2013.01); *G09G 3/2007* (2013.01); *G09G 2320/0233* (2013.01);
(Continued)

(58) Field of Classification Search
None
See application file for complete search history.

(56) References Cited

U.S. PATENT DOCUMENTS 5,917,363 A * 6/1999 Jandu ................... G11C 27/026
327/415
6,963,177 B2 * 11/2005 Ito ........................ B60Q 11/005
315/307
(Continued)

FOREIGN PATENT DOCUMENTS

| | | |
|---|---|---|
| JP | 2006-065242 A | 3/2006 |
| JP | 2009-043500 A | 2/2009 |
| JP | 2012-155923 A | 8/2012 |

OTHER PUBLICATIONS

International Search Report and Written Opinion of PCT Application No. PCT/JP2023/004420, issued on Mar. 14, 2023, 09 pages of ISRWO.

*Primary Examiner* — Matthew Yeung
(74) *Attorney, Agent, or Firm* — CHIP LAW GROUP

(57) ABSTRACT

Provided is an electric current control circuit that includes an amplifier including a first inputter, a second inputter, and an outputter, a first resistance element and a second resistance element, a first switch provided between the first resistance element and the second inputter, a second switch provided between the second resistance element and the second inputter, a third switch and a fourth switch electrically coupled to the outputter, a first transistor provided between the first resistance element and a first terminal, the first transistor being to be inputted with an output voltage of the outputter via the third switch, and a second transistor pro-
(Continued)

vided between the second resistance element and the first terminal, the second transistor being to be inputted with an output voltage of the outputter via the fourth switch.

14 Claims, 7 Drawing Sheets

(52) U.S. Cl.
CPC ............... *G09G 2320/0276* (2013.01); *G09G 2320/0686* (2013.01)

(56) References Cited

U.S. PATENT DOCUMENTS

| | | | | |
|---|---|---|---|---|
| 7,211,967 | B2 * | 5/2007 | Lin | H05B 45/395 327/109 |
| 7,728,529 | B2 * | 6/2010 | Liu | H05B 45/46 315/210 |
| 8,471,605 | B2 * | 6/2013 | Lee | H05B 45/46 345/82 |
| 9,775,208 | B2 * | 9/2017 | Louvel | H05B 45/10 |
| 2012/0169417 | A1 * | 7/2012 | Sakai | H05B 45/395 330/69 |
| 2014/0035471 | A1 * | 2/2014 | Chiang | G09G 3/342 315/185 R |
| 2014/0145640 | A1 * | 5/2014 | Park | H05B 45/44 315/287 |
| 2016/0316537 | A1 | 10/2016 | Schiappelli et al. | |
| 2020/0058257 | A1 * | 2/2020 | Pan | G09G 3/36 |
| 2021/0068227 | A1 * | 3/2021 | Mai | H05B 45/31 |
| 2022/0208076 | A1 * | 6/2022 | Shao | G09G 3/32 |
| 2023/0276550 | A1 * | 8/2023 | Chen | H05B 45/345 315/291 |

* cited by examiner

[ FIG. 1 ]
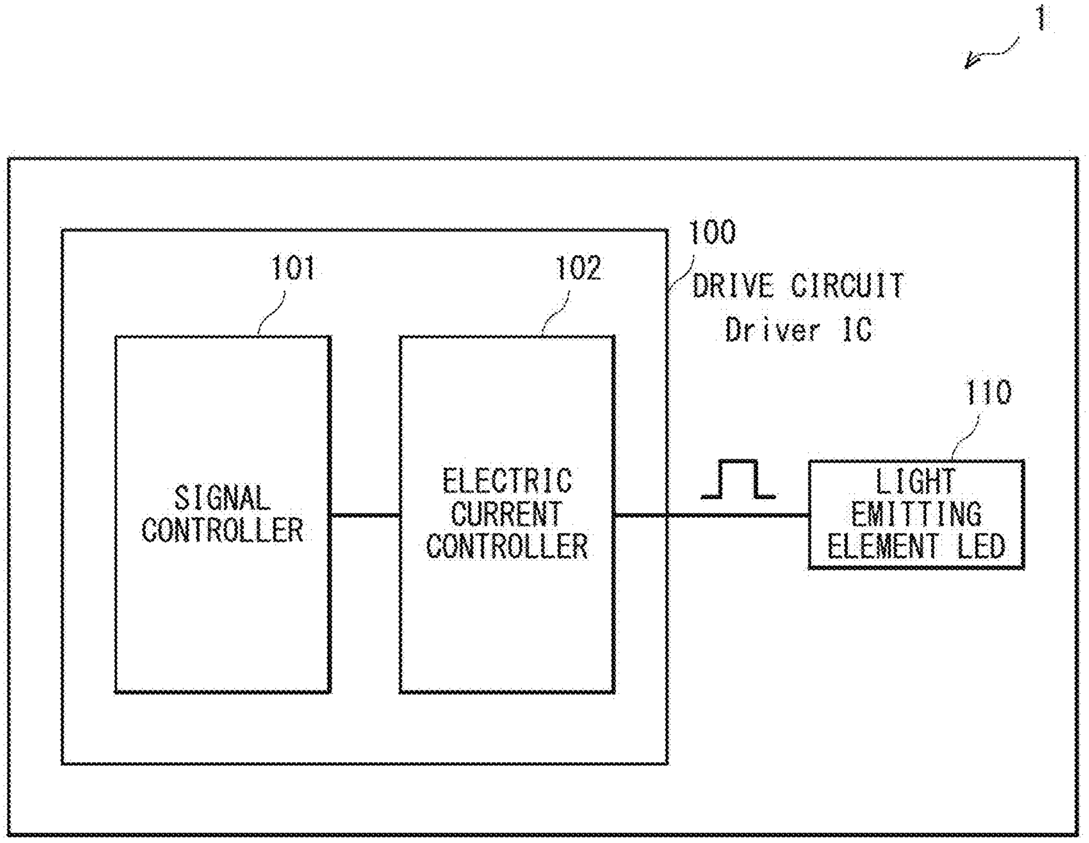

【 FIG. 2 】
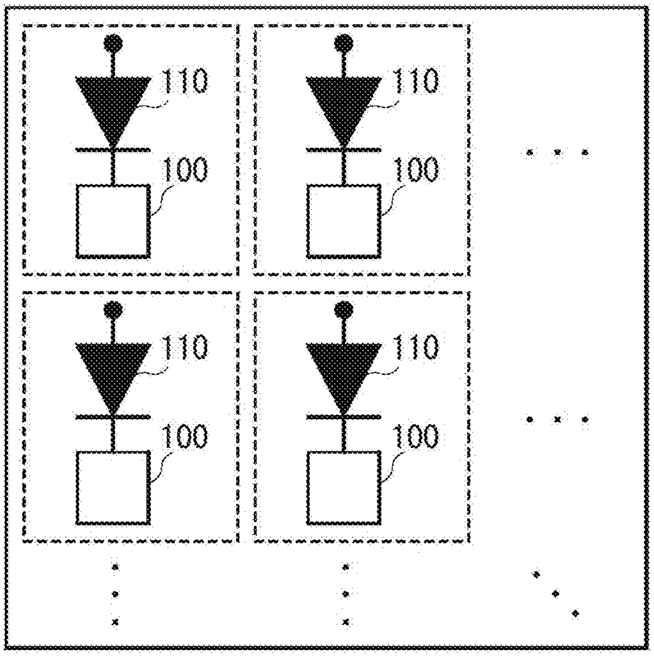
【 FIG. 3 】
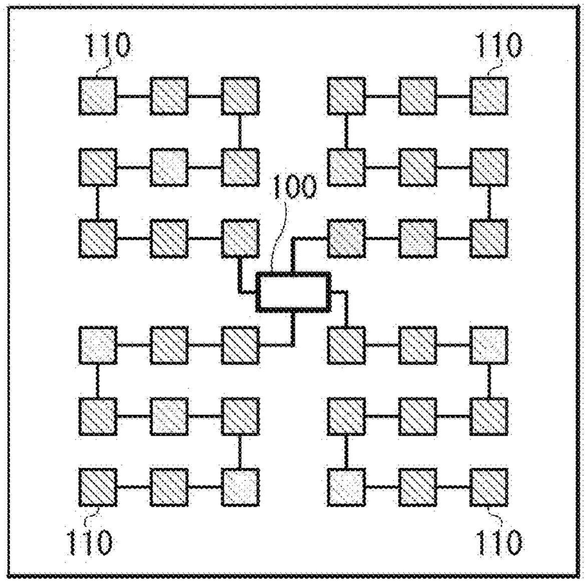

[ FIG. 4 ]
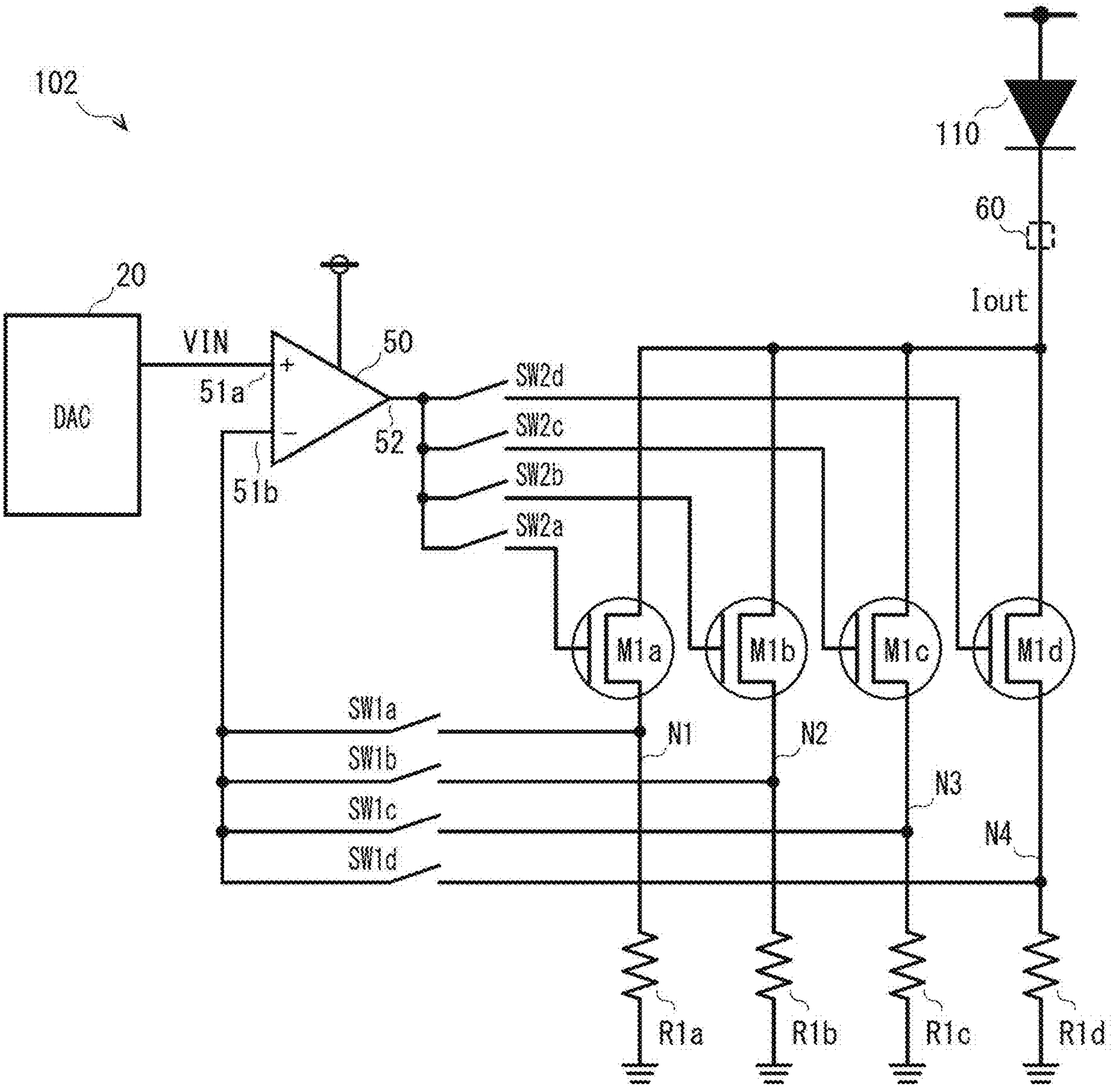

[ FIG. 5 ]
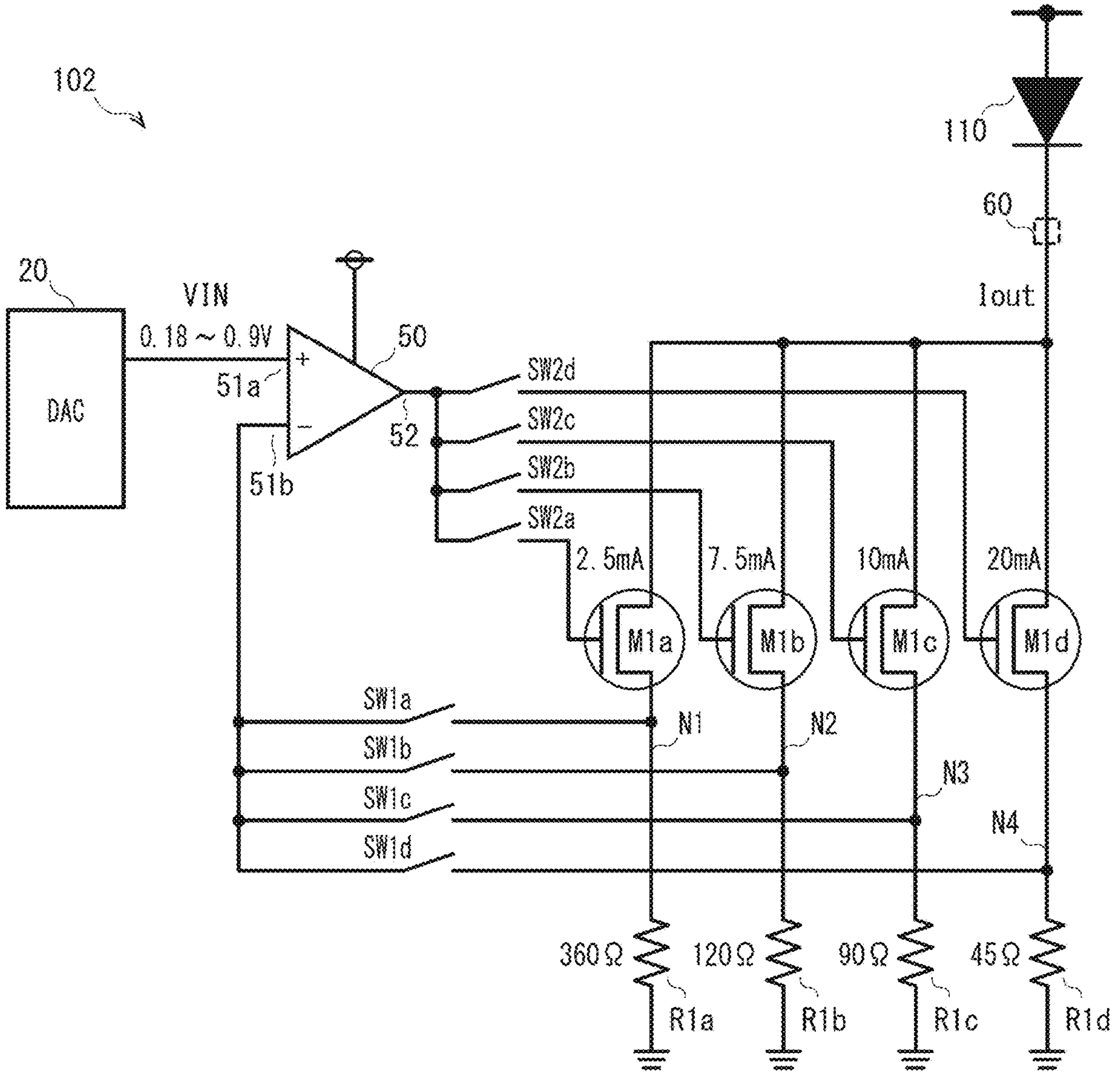

[ FIG. 6 ]
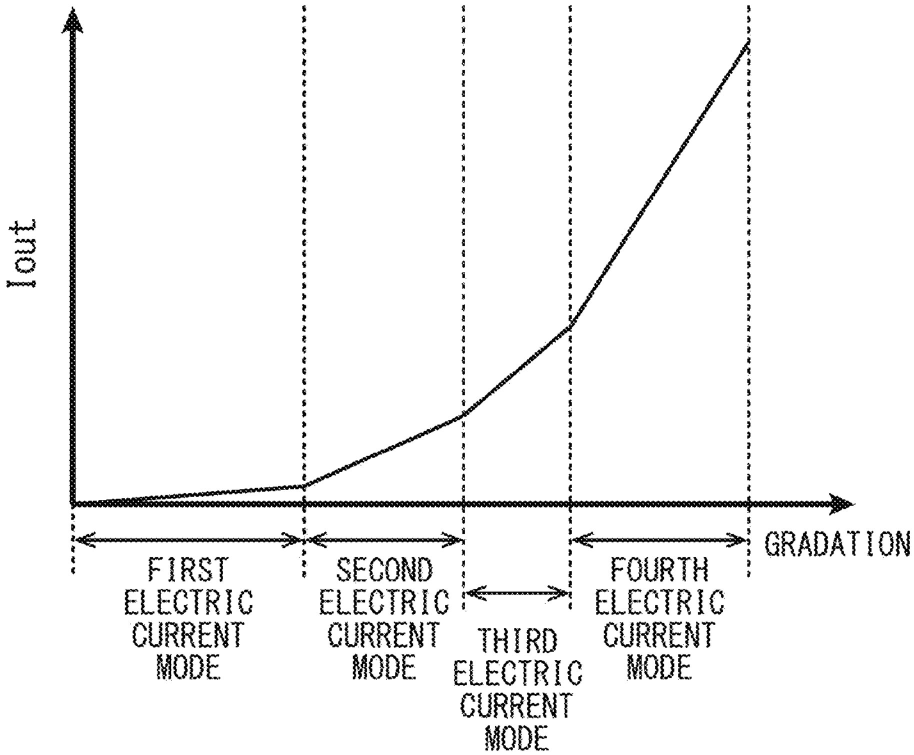

[ FIG. 7 ]
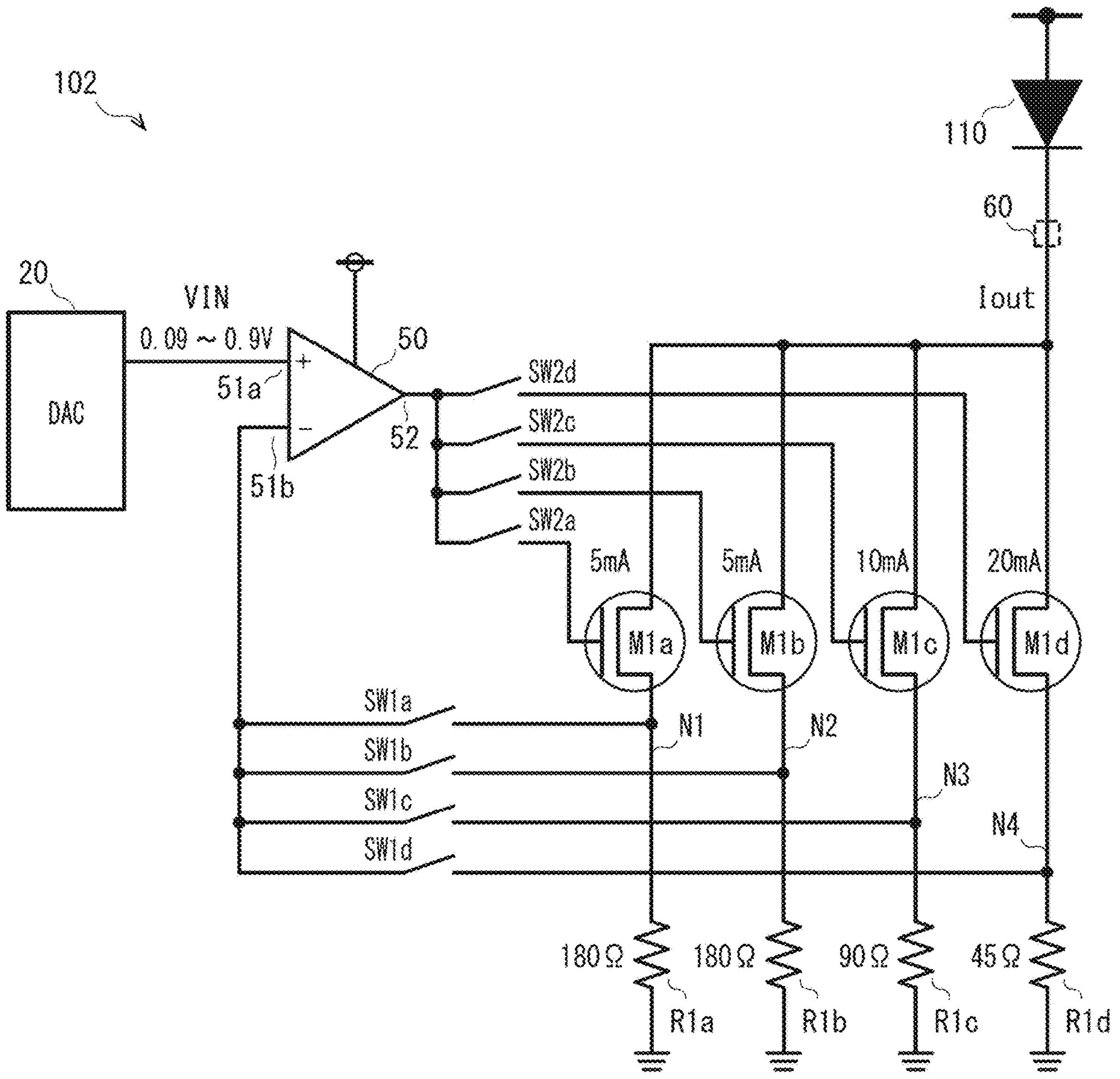

[ FIG. 8 ]
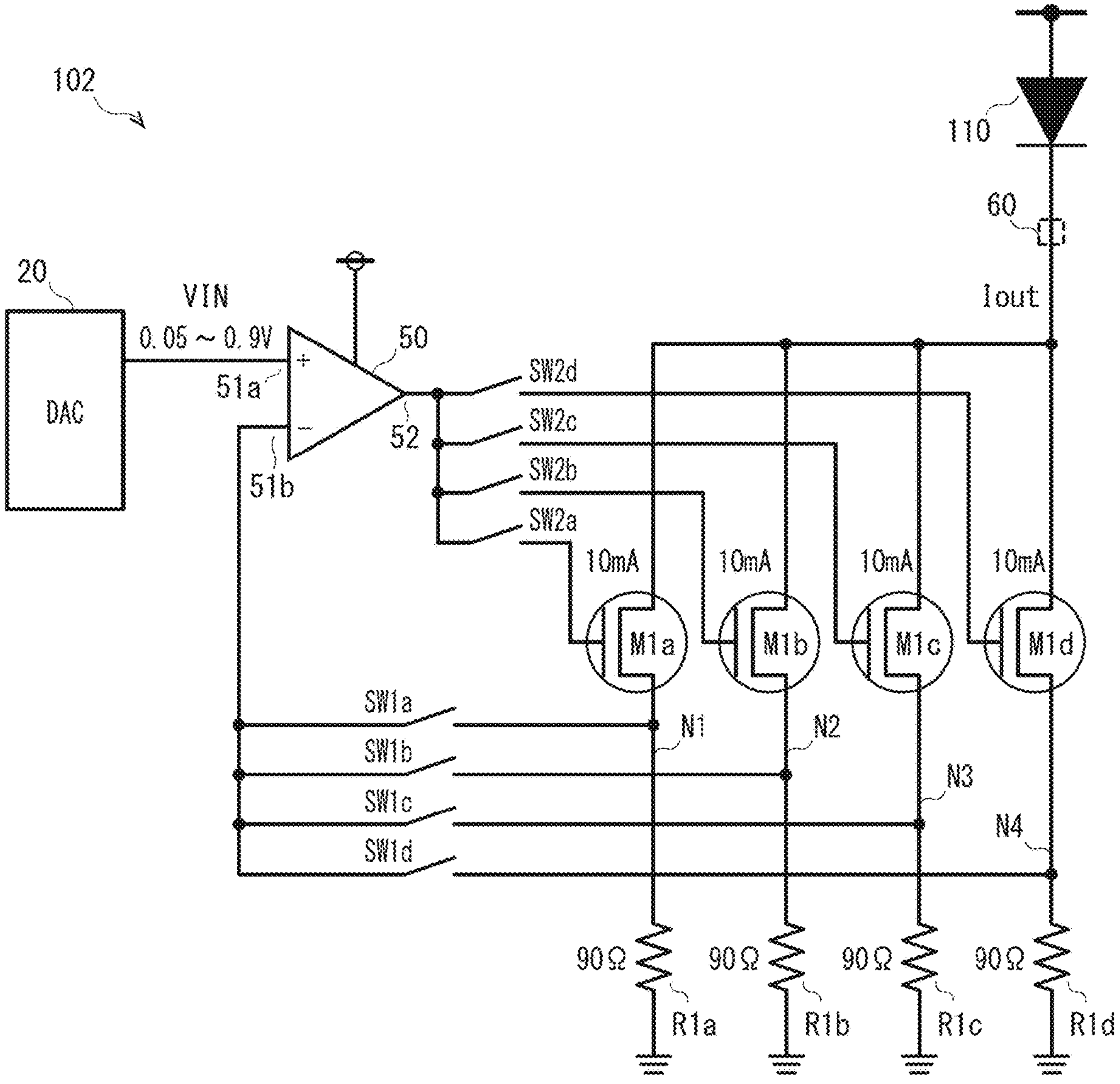

ELECTRIC CURRENT CONTROL CIRCUIT, CONTROL DEVICE, AND DISPLAY DEVICE

CROSS REFERENCE TO RELATED APPLICATIONS

This application is a U.S. National Phase of International Patent Application No. PCT/JP2023/004420 filed on Feb. 9, 2023, which claims priority benefit of Japanese Patent Application No. JP 2022-045967 filed in the Japan Patent Office on Mar. 22, 2022. Each of the above-referenced applications is hereby incorporated herein by reference in its entirety.

TECHNICAL FIELD

The present disclosure relates to an electric current control circuit, a control device, and a display device.

BACKGROUND ART

A circuit that uses an analog switch to switch an externally-attached resistor to change a magnitude of a reference electric current has been proposed.

CITATION LIST

Patent Literature

PTL 1: Japanese Unexamined Patent Application Publication (Published Japanese Translation of PCT Application) No. JP 2006-65242

SUMMARY OF THE INVENTION

In such electric current control circuits, improvement of performance has been demanded.

It has been demanded to provide an electric current control circuit having proper performance.

An electric current control circuit according to an embodiment of the present disclosure includes: an amplifier including a first inputter, a second inputter, and an outputter; a first resistance element and a second resistance element; a first switch provided between the first resistance element and the second inputter; a second switch provided between the second resistance element and the second inputter; a third switch and a fourth switch electrically coupled to the outputter; a first transistor provided between the first resistance element and a first terminal, the first transistor being to be inputted with an output voltage of the outputter via the third switch; and a second transistor provided between the second resistance element and the first terminal, the second transistor being to be inputted with an output voltage of the outputter via the fourth switch.

A control device according to the embodiment of the present disclosure includes: a light emitting element; and an electric current control circuit configured to control supplying of an electric current to the light emitting element. The electric current control circuit includes: an amplifier including a first inputter, a second inputter, and an outputter; a first resistance element and a second resistance element; a first switch provided between the first resistance element and the second inputter; a second switch provided between the second resistance element and the second inputter; a third switch and a fourth switch electrically coupled to the outputter; a first transistor provided between the first resistance element and the light emitting element, the first transistor being to be inputted with an output voltage of the outputter via the third switch; and a second transistor provided between the second resistance element and the light emitting element, the second transistor being to be inputted with an output voltage of the outputter via the fourth switch.

A display device according to the embodiment of the present disclosure includes: a plurality of light emitting elements; and an electric current control circuit configured to control supplying of an electric current to the light emitting elements. The electric current control circuit includes: an amplifier including a first inputter, a second inputter, and an outputter; a first resistance element and a second resistance element; a first switch provided between the first resistance element and the second inputter; a second switch provided between the second resistance element and the second inputter; a third switch and a fourth switch electrically coupled to the outputter; a first transistor provided between the first resistance element and each of the light emitting elements, the first transistor being to be inputted with an output voltage of the outputter via the third switch; and a second transistor provided between the second resistance element and each of the light emitting elements, the second transistor being to be inputted with an output voltage of the outputter via the fourth switch.

BRIEF DESCRIPTION OF DRAWING

FIG. 1 is a view illustrating an example of an outline configuration of a control device according to an embodiment of the present disclosure.

FIG. 2 is a view illustrating a disposition example of a signal controller and an electric current controller according to the embodiment of the present disclosure.

FIG. 3 is a view illustrating another disposition example of the signal controller and the electric current controller according to the embodiment of the present disclosure.

FIG. 4 is a view for describing a configuration example of the electric current controller in the control device according to the embodiment of the present disclosure.

FIG. 5 is a view illustrating a configuration example of the electric current controller in the control device according to the embodiment of the present disclosure.

FIG. 6 is a view for describing an example of electric current control by the control device according to the embodiment of the present disclosure.

FIG. 7 is a view illustrating a configuration example of an electric current controller in a control device according to a modification example of the present disclosure.

FIG. 8 is a view illustrating another configuration example of an electric current controller in a control device according to a modification example of the present disclosure.

MODES FOR CARRYING OUT THE INVENTION

In the following, an embodiment of the present disclosure will be described in detail with reference to the drawings. It is to be noted that description will be given in the following order.

1. Embodiment
2. Modification Examples

1. Embodiment

FIG. 1 is a view illustrating an example of an outline configuration of a control device according to an embodiment of the present disclosure. A control device 1 is a device configured to control light emission by a light emitting element 110. The control device 1 is, for example, a device configured to control back light (a back light control device). Furthermore, it is possible to apply the control device 1 to various types of display devices including televisions (TVs) and monitors, for example. An example of the display devices includes a display device such as a liquid crystal panel or an organic electro luminescence (EL) panel.

The control device 1 includes the light emitting element 110. The light emitting element 110 is, for example, a light emitting diode (LED). Furthermore, the control device 1 includes, as illustrated in FIG. 1, a signal controller 101 and an electric current controller 102. Note that, although FIG. 1 illustrates only one light emitting element 110, only one signal controller 101, and only one electric current controller 102, a plurality of light emitting elements 110, a plurality of signal controllers 101, and a plurality of electric current controllers 102 may be disposed in the control device 1. For example, the plurality of light emitting elements 110 is disposed in a two dimensional matrix. The light emitting element 110 may be an organic EL element.

The signal controller 101 is a signal control circuit, and is configured to perform signal processing. Note that the signal controller 101 and the electric current controller 102 may be integrated with each other.

The signal controller 101 is configured to control each component of the control device 1. The signal controller 101 controls, for example, operation of the electric current controller 102. The signal controller 101 generates and outputs, to the electric current controller 102, a signal regarding an electric current for the light emitting element 110 (hereinafter referred to as an electric current setting signal). The signal controller 101 generates, for example, as an electric current setting signal, a digital signal regarding a magnitude of an electric current to be supplied to the light emitting element 110. An electric current setting signal is a signal indicating a setting value of an electric current for the light emitting element 110, and is also referred to as a signal indicating a gradation.

The signal controller 101 may receive a clock signal provided externally and data that instructs an operation mode, and, furthermore, may output data of internal information of the control device 1, for example. Furthermore, pulse signals, which on-off controls each switch in the electric current controller 102, clock signals, and other signals are supplied to the electric current controller 102, for example.

The electric current controller 102 is configured to control an electric current for the light emitting element 110. The electric current controller 102 is an electric current control circuit, and includes a digital-to-analog converter (DA converter or DAC) and a plurality of circuits including an amplifier circuit, for example. The electric current controller 102 is configured to supply an electric current to the light emitting element 110 to control the light emitting element 110.

The electric current controller 102 is, for example, provided per the light emitting element 110. The electric current controller 102 may supply an electric current for driving the light emitting element 110 to the light emitting element 110 to control light emission by the light emitting element 110. The electric current controller 102 is a driver configured to control driving of the light emitting element 110, and is also referred to as a driver integrated circuit (IC) (a driver circuit).

The signal controller 101 and the electric current controller 102 may be formed on an identical substrate. The drive circuit (chip) 100 provided with the signal controller 101 and the electric current controller 102 is, for example, an element including a semiconductor substrate (also referred to as an electric current control element). The drive circuit 100 including the signal controller 101 and the electric current controller 102 is, for example, as schematically illustrated in FIG. 2, provided per the light emitting element 110. In this case, it is possible to highly accurately control the light emitting element 110.

Note that the signal controller 101 and the electric current controller 102 may be provided per a plurality of light emitting elements 110. For example, as illustrated in the example in FIG. 3, the drive circuit 100 may be provided per a plurality of light emitting elements 110. The electric current controller 102 according to the present embodiment will now be further described herein.

FIG. 4 is a view for describing a configuration example of the electric current controller in the control device according to the embodiment. The electric current controller 102 includes a DA converter 20, an amplifier 50, and a plurality of transistors M1 (in FIG. 4, a transistor M1*a* to a transistor M1*d*). Furthermore, the electric current controller 102 includes a plurality of switches SW1 (in FIG. 4, a switch SW1*a* to a switch SW1*d*) and a plurality of switches SW2 (in FIG. 4, a switch SW2*a* to a switch SW2*d*).

Furthermore, the electric current controller 102 includes a plurality of resistance elements R1 (in FIG. 4, a resistance element R1*a* to a resistance element R1*d*) and a terminal 60. The terminal 60 is electrically coupled to the light emitting element 110. The terminal 60 is a terminal (an electrode) used for supplying an electric current to the light emitting element 110. In the example illustrated in FIG. 4, an anode that is an electrode of the light emitting element 110 is coupled to a power source line to which a power source voltage is to be provided. A cathode that is another electrode of the light emitting element 110 is electrically coupled to the transistor M1*a* to the transistor M1*d* in the electric current controller 102 via the terminal 60.

The DA converter 20 is configured to generate a voltage in accordance with a digital signal to be inputted. The DA converter 20 is inputted with an electric current setting signal from the signal controller 101. The DA converter 20 converts the electric current setting signal that is a digital signal into an analog signal. In the example illustrated in FIG. 4, the DA converter 20 generates and outputs, to the amplifier 50, a signal having a voltage VIN corresponding to a value of the electric current setting signal.

The amplifier 50 includes, for example, an amplifier circuit that includes an inputter 51*a*, an inputter 51*b*, and an outputter 52 and that is configured to amplitude a signal. In the example illustrated in FIG. 4, the inputter 51*a* in the amplifier 50 is a first input terminal, and is electrically coupled to the DA converter 20. The inputter 51*a* is inputted with a signal having the voltage VIN from the DA converter 20.

The inputter 51*b* in the amplifier 50 is a second input terminal. The inputter 51*b* is electrically coupled to the switch SW1*a* to the switch SW1*d*. Note that, in the example illustrated in FIG. 4, the inputter 51*a* is a positive input terminal, and the inputter 51*b* is a negative input terminal. The outputter 52 in the amplifier 50 is an output terminal, and is electrically coupled to the switch SW2*a* to the switch SW2*d*. The amplifier 50 may output, from the outputter 52, a voltage based on the voltage VIN inputted to the inputter 51*a* and a voltage inputted to the inputter 51*b*.

The switch SW1*a* is provided between the resistance element R1*a* and the inputter 51*b* in the amplifier 50. An end of the switch SW1*a* is coupled to the resistance element R1*a* and the transistor M1*a*. Another end of the switch SW1*a* is coupled to the inputter 51*b*. The switch SW1*a* is configured to electrically couple a node N1 coupling the resistance element R1*a* and the transistor M1*a* to the inputter 51*b*. The switch SW1*a* electrically couples or decouples the node N1 and the inputter 51*b*.

The switch SW1*b* is provided between the resistance element R1*b* and the inputter 51*b* in the amplifier 50. An end of the switch SW1*b* is coupled to the resistance element R1*b* and the transistor M1*b*. Another end of the switch SW1*b* is coupled to the inputter 51*b*. The switch SW1*b* is configured to electrically couple a node N2 coupling the resistance element R1*b* and the transistor M1*b* to the inputter 51*b*. The switch SW1*b* electrically couples or decouples the node N2 and the inputter 51*b*.

The switch SW1*c* is provided between the resistance element R1*c* and the inputter 51*b* in the amplifier 50. An end of the switch SW1*c* is coupled to the resistance element R1*c* and the transistor M1*c*. Another end of the switch SW1*c* is coupled to the inputter 51*b*. The switch SW1*c* is configured to electrically couple a node N3 coupling the resistance element R1*c* and the transistor M1*c* to the inputter 51*b*. The switch SW1*c* electrically couples or decouples the node N3 and the inputter 51*b*.

The switch SW1*d* is provided between the resistance element R1*d* and the inputter 51*b* in the amplifier 50. An end of the switch SW1*d* is coupled to the resistance element R1*d* and the transistor M1*d*. Another end of the switch SW1*d* is coupled to the inputter 51*b*. The switch SW1*d* is configured to electrically couple a node N4 coupling the resistance element R1*d* and the transistor M1*d* to the inputter 51*b*. The switch SW1*d* electrically couples or decouples the node N4 and the inputter 51*b*. The switches SW1*a*, SW1*b*, SW1*c*, and SW1*d* each include a transistor.

The switch SW2*a* is provided between the outputter 52 in the amplifier 50 and the transistor M1*a*. An end of the switch SW2*a* is coupled to the outputter 52. Another end of the switch SW2*a* is coupled to a gate of the transistor M1*a*. The switch SW2*a* is configured to electrically couple the outputter 52 and the gate of the transistor M1*a*. The switch SW2*a* electrically couples or decouples the outputter 52 and the gate of the transistor M1*a*.

The switch SW2*b* is provided between the outputter 52 in the amplifier 50 and the transistor M1*b*. An end of the switch SW2*b* is coupled to the outputter 52. Another end of the switch SW2*b* is coupled to a gate of the transistor M1*b*. The switch SW2*b* is configured to electrically couple the outputter 52 and the gate of the transistor M1*b*. The switch SW2*b* electrically couples or decouples the outputter 52 and the gate of the transistor M1*b*.

The switch SW2*c* is provided between the outputter 52 in the amplifier 50 and the transistor M1*c*. An end of the switch SW2*c* is coupled to the outputter 52. Another end of the switch SW2*c* is coupled to a gate of the transistor M1*c*. The switch SW2*c* is configured to electrically couple the outputter 52 and the gate of the transistor M1*c*. The switch SW2*c* electrically couples or decouples the outputter 52 and the gate of the transistor M1*c*.

The switch SW2*d* is provided between the outputter 52 in the amplifier 50 and the transistor M1*d*. An end of the switch SW2*d* is coupled to the outputter 52. Another end of the switch SW2*d* is coupled to a gate of the transistor M1*d*. The switch SW2*d* is configured to electrically couple the outputter 52 and the gate of the transistor M1*d*. The switch SW2*d* electrically couples or decouples the outputter 52 and the gate of the transistor M1*d*. The switches SW2*a*, SW2*b*, SW2*c*, and SW2*d* each include a transistor.

The resistance element R1*a* to the resistance element R1*d* are resistance bodies, and, as illustrated in FIG. 4, coupled to the transistor M1*a* to the transistor M1*d* in series, respectively. An end of the resistance element R1*a* is coupled to the transistor M1*a* and the switch SW1*a*. Another end of the resistance element R1*a* is coupled to a reference electric potential line. In the example illustrated in FIG. 4, the reference electric potential line is a grounding line (a ground line).

An end of the resistance element R1*b* is coupled to the transistor M1*b* and the switch SW1*b*. Another end of the resistance element R1*b* is coupled to the reference electric potential line. An end of the resistance element R1*c* is coupled to the transistor M1*c* and the switch SW1*c*. Another end of the resistance element R1*c* is coupled to the reference electric potential line. Furthermore, an end of the resistance element R1*d* is coupled to the transistor M1*d* and the switch SW1*d*. Another end of the resistance element R1*d* is coupled to the reference electric potential line.

The transistor M1*a* to the transistor M1*d* are metal-oxide-semiconductor (MOS) transistors (MOS field-effect transistors or MOSFETs) each having terminals for the gate, a source, and a drain, respectively. In the example illustrated in FIG. 4, the transistor M1*a* to the transistor M1*d* include n-channel MOS (NMOS) transistors, respectively. Note that the transistors in the electric current controller 102 may be p-channel MOS (PMOS) transistors, as necessary.

One of the source and the drain of the transistor M1*a* is electrically coupled to the light emitting element 110 via the terminal 60. Another one of the source and the drain of the transistor M1*a* is coupled to the resistance element R1*a* and the switch SW1*a*. The gate of the transistor M1*a* is electrically coupled to the switch SW2*a*. Furthermore, one of the source and the drain of the transistor M1*b* is electrically coupled to the light emitting element 110 via the terminal 60. Another one of the source and the drain of the transistor M1*b* is coupled to the resistance element R1*b* and the switch SW1*b*. The gate of the transistor M1*b* is electrically coupled to the switch SW2*b*.

One of the source and the drain of the transistor M1*c* is electrically coupled to the light emitting element 110 via the terminal 60. Another one of the source and the drain of the transistor M1*c* is coupled to the resistance element R1*c* and the switch SW1*c*. The gate of the transistor M1*c* is electrically coupled to the switch SW2*c*. Furthermore, one of the source and the drain of the transistor M1*d* is electrically coupled to the light emitting element 110 via the terminal 60. Another one of the source and the drain of the transistor M1*d* is coupled to the resistance element R1*d* and the switch SW1*d*. The gate of the transistor M1*d* is electrically coupled to the switch SW2*d*.

The signal controller 101 (see FIG. 1) supplies signals to the switches in the electric current controller 102 (the switch SW1*a* to the switch SW1*d* and the switch SW2*a* to the switch SW2*d*) to on-off control the switches. The switches in the electric current controller 102 are controlled for an on state (an electrically-conducting state) or an off state (a non-electrically-conducting state) by the signals from the signal controller 101. The signal controller 101 supplies, to the switches, signals for controlling the switches to switch coupling destinations for the outputter 52 and the inputter 51*b* in the amplifier 50.

In the electric current controller 102, the amplifier 50 adjusts an electric current Iout flowing between the terminal 60 and the reference electric potential line to make a voltage at each of the nodes coupled to the inputter 51*b* in the amplifier 50 identical in voltage to the voltage VIN inputted to the inputter 51*a*. Therefore, the signal controller 101 switches each of the transistors and each of resistors coupled between the outputter 52 and the inputter 51*b*, making it possible to change the electric current Iout to be supplied to the light emitting element 110.

In the example illustrated in FIG. 4, the signal controller 101 may control a resistance value of each of the resistors coupled between the inputter 51*b* and the reference electric potential line to finely adjust an electric current value of the electric current Iout. For example, as the switch SW1*a* and the switch SW2*a* are both turned to the on state, the outputter 52 and the transistor M1*a* are electrically coupled to each other, and the inputter 51*b* and the resistance element R1*a* are electrically coupled to each other. In this case, it is possible to supply the electric current Iout in accordance with the voltage VIN and a resistance value of the resistance element R1*a* to the light emitting element 110.

As resistance elements coupled to the inputter 51*b* increase in number, among the resistance element R1*a* to the resistance element R1*d*, the electric current Iout that is possible to be supplied to the light emitting element 110 via the terminal 60 increases. Furthermore, the electric current Iout becomes an electric current having a magnitude in accordance with a voltage value of the voltage VIN generated in accordance with a value of an electric current setting signal.

Furthermore, the signal controller 101 may adjust a pulse width of a control signal to be supplied to each of the switches in the electric current controller 102 (for example, a high-level pulse width) to change a timing and a period of time of supplying an electric current to the light emitting element 110. The signal controller 101 and the electric current controller 102 are possible to use a pulse width modulation (PWM) method to control supplying of an electric current to the light emitting element 110.

In the present embodiment, it is possible to set coupling states of the resistance element R1*a* to the resistance element R1*d* and values of electric current setting signals to adjust an electric current to be supplied to the light emitting element 110 and to adjust brightness of light and a period of time of light emission by the light emitting element 110, for example. It is possible to adjust the resistance values of the resistance element R1*a* to the resistance element R1*d* by using an electric current to be supplied to the light emitting element 110, resolution (a number of bits) of the DA converter 20, and gradations, for example. The resistance element R1*a* to the resistance element R1*d* may have weighted resistance values to acquire desired gradation characteristics. The resistance element R1*a* to the resistance element R1*d* may have resistance values that are different from each other.

FIG. 5 is a view illustrating a configuration example of the electric current controller in the control device according to the embodiment. Furthermore, FIG. 6 is a view for describing an example of electric current control by the control device. In the examples illustrated in FIGS. 5 and 6, the resistance element R1*a* to the resistance element R1*d* have resistance values that are different from each other. The electric current controller 102 includes the resistance element R1*a* to the resistance element R1*d* that have been weighted.

The resistance value of the resistance element R1*a* is 360Ω, and the resistance value of the resistance element R1*b* is 120Ω. The resistance value of the resistance element R1*c* is 90Ω, and the resistance value of the resistance element R1*d* is 45Ω. Furthermore, as illustrated in FIG. 5, the voltage VIN to be inputted from the DA converter 20 to the amplifier 50 has a value falling within a range from 0.18 V to 0.9 V inclusive.

The control device 1 has a plurality of operation modes where the coupling states of the switches in the electric current controller 102 are different from each other. The control device 1 has, for example, as the operation modes, a first electric current mode, a second electric current mode, a third electric current mode, and a fourth electric current mode. The signal controller 101 turns, in a case of the first electric current mode, for example, the switch SW1*a* and the switch SW2*a* to the on state, and the other switches to the off state, among the switches in the electric current controller 102 (the switch SW1*a* to the switch SW1*d* and the switch SW2*a* to the switch SW2*d*). In the first electric current mode, the electric current controller 102 is in a state where the transistor M1*a* is possible to supply the electric current Iout having a maximum value of 2.5 mA to the light emitting element 110.

In a case of the second electric current mode, the signal controller 101 turns the switch SW1*a* and the switch SW2*a* and the switch SW1*b* and the switch SW2*b* to the on state, and the other switches to the off state, among the switches in the electric current controller 102. In the second electric current mode, the electric current controller 102 is possible to cause the transistors M1*a* and M1*b* to supply the electric current Iout having a maximum value of 10 mA to the light emitting element 110.

In a case of the third electric current mode, the signal controller 101 turns the switches SW1*a*, SW1*b*, SW1*c*, SW2*a*, SW2*b*, and SW2*c* to the on state, and the other switches to the off state, among the switches in the electric current controller 102. In the third electric current mode, the electric current controller 102 is possible to cause the transistors M1*a*, M1*b*, and M1*c* to supply the electric current Iout having a maximum value of 20 mA to the light emitting element 110.

Furthermore, in a case of the fourth electric current mode, the signal controller 101 turns all the switches in the electric current controller 102, that is, the switches SW1*a* to SW1*d* and SW2*a* to SW2*d* to the on state. In the fourth electric current mode, the electric current controller 102 is possible to cause the transistors M1*a* to M1*d* to supply the electric current Iout having a maximum value of 40 mA to the light emitting element 110. As described above, switching of the operation modes makes it is possible to supply the electric current Iout having a magnitude of up to 40 mA to the light emitting element 110, for example, making it possible to achieve a wide dynamic range.

In the present embodiment, the resistance elements used to generate a low electric current, that is, an electric current for a low brightness region, which is supplied to the light emitting element 110, have relatively high resistance values. As the resistance values are weighted in the example illustrated in FIG. 5, the resistance value of the resistance element R1*a* is 360Ω that is greater than the resistance values of the other resistance elements. In this case, it is possible to use the voltage VIN having an enough voltage value (for example, 0.9 V) higher than a value of an offset voltage of the amplifier 50 to generate a low electric current. Therefore, it is possible to reduce errors in the electric current Iout, compared with a case where the voltage VIN having a low voltage value is used to generate a low electric current.

Thereby, in the control device 1 according to the present embodiment, it is possible to suppress occurrence of deviation in the electric current value of the electric current Iout, which may occur due to the offset voltage of the amplifier 50. Even in a case of a low electric current range (a low brightness range) within which a low electric current is supplied to the light emitting element 110, it is possible to accurately generate and supply, to the light emitting element 110, the electric current Iout that is a low electric current, making it possible to perform fine gradation expression. Even in the low electric current range, it is possible to achieve multi-gradations. In a case where the control device 1 is applied as a back light control device or a display device, for example, it is possible to achieve high-definition image display.

As described above, in the present embodiment, it is possible to reduce errors in the electric current Iout, making it possible to achieve characteristics similar to target gamma characteristics. As illustrated in the example in FIG. 6, it is possible to secure a number of gradations in a low electric current range by taking into account sensitivity of human eyes. Therefore, it is possible to perform fine adjustments on gray scale. It is possible to achieve high-resolution image display.

In the control device 1, as described above, switching the coupling states of the switches in the electric current controller 102 makes it possible to perform fine adjustments on the electric current Iout. Therefore, it is possible to use the DA converter 20 having relatively low resolution, making it possible to reduce an area of the DA converter 20, compared with a case where electric current control for the light emitting element 110 is performed only on the basis of control of an output voltage of the DA converter 20. It is possible to suppress an increase in chip area, making it possible to suppress an increase in cost of manufacturing the control device 1. Furthermore, it is possible to reduce electric power to be consumed.

Furthermore, in the present embodiment, the switches SW1 (the switch SW1*a* to the switch SW1*d*) are coupled to the inputter 51*b* in the amplifier 50 having high input impedance, and thus provided on high impedance routes. The switches SW1 are disposed on a feedback loop for the amplifier 50. Therefore, it is possible to avoid addition of parasitic resistance for the switches on the routes between the terminal 60 and the reference electric potential line, making it possible to suppress errors in the electric current Iout. It is possible to prevent an increase in electric power to be consumed, which may occur due to negative effects of parasitic resistance.

Workings and Effects

An electric current control circuit (the electric current controller 102) according to the present embodiment includes: an amplifier (the amplifier 50) including a first inputter, a second inputter, and an outputter; a first resistance element and a second resistance element (for example, the resistance element R1*a* and the resistance element R1*b*); a first switch (the switch SW1*a*) provided between the first resistance element and the second inputter; a second switch (the switch SW1*b*) provided between the second resistance element and the second inputter; a third switch and a fourth switch (the switch SW2*a* and the switch SW2*b*) electrically coupled to the outputter; a first transistor (the transistor M1*a*) provided between the first resistance element and a first terminal (the terminal 60), the first transistor being to be inputted with an output voltage of the outputter via the third switch; and a second transistor (the transistor M1*b*) provided between the second resistance element and the first terminal, the second transistor being to be inputted with an output voltage of the outputter via the fourth switch.

The electric current control circuit (the electric current controller 102) according to the present embodiment is provided with the switches SW1*a*, SW1*b*, SW2*a*, and SW2*b*, the transistors M1*a* and M1*b*, and the resistance elements R1*a* and R1*b*. It is possible to control the switches SW1*a*, SW1*b*, SW2*a*, and SW2*b* to accurately generate an electric current for the light emitting element, making it possible to achieve a high-performance electric current control circuit.

Next, modification examples of the present disclosure will now be described herein. Like reference numerals designate identical or similar components in the embodiment described above, and some descriptions are thus appropriately omitted below.

2. Modification Examples

Although, in the embodiment described above, the configuration example of the electric current controller 102 has been described, numbers of the switches SW1 and SW2 and a number and the resistance values of the resistance elements R in the electric current controller 102, for example, are not limited to the illustrated example. FIGS. 7 and 8 are views illustrating configuration examples of electric current controllers in control devices according to the modification examples of the present disclosure.

As an example, as illustrated in the example in FIG. 7, some resistance elements R among a plurality of resistance elements R may have resistance values identical to each other. In the example illustrated in FIG. 7, a resistance value of the resistance element R1*a* and a resistance value of the resistance element R1*b* are both 180Ω. Note that a resistance value of the resistance element R1*c* is 90Ω, and a resistance value of the resistance element R1*d* is 45Ω.

Furthermore, as another example, as illustrated in the example in FIG. 8, the resistance element R1*a* to the resistance element R1*d* may all have resistance values identical to each other in magnitude. In the example illustrated in FIG. 8, the resistance values of the resistance element R1*a* to the resistance element R1*d* are all 90Ω. Note that a number of sets (groups) of the switch SW1, the switch SW2, and the transistor M1 to be provided may be five, six, or more.

Although the present disclosure has been described with reference to the embodiment and the modification examples, the present technique is not limited to the embodiment and the modification examples described above, but may be modified in a wide variety of ways. For example, although the modification examples described above have been described as modification examples of the embodiment described above, it is possible to appropriately combine the configurations of the modification examples.

Note that the effects described in the specification are mere examples. The effects of the technique are not limited to the effects described in the specification. There may be any other effects than those described herein. Furthermore, it is possible that the present disclosure has configurations described below.

(1)

An electric current control circuit including:

an amplifier including a first inputter, a second inputter, and an outputter;

a first resistance element and a second resistance element;

a first switch provided between the first resistance element and the second inputter;

a second switch provided between the second resistance element and the second inputter;

a third switch and a fourth switch electrically coupled to the outputter;

a first transistor provided between the first resistance element and a first terminal, the first transistor being to be inputted with an output voltage of the outputter via the third switch; and a second transistor provided between the second resistance element and the first terminal, the second transistor being to be inputted with an output voltage of the outputter via the fourth switch.

(2)

The electric current control circuit described in (1), in which the first transistor is configured to supply an electric current to the first terminal on the basis of an output voltage of the outputter, and the second transistor is configured to supply an electric current to the first terminal on the basis of an output voltage of the outputter.

(3)

The electric current control circuit described in (1) or (2), in which the first transistor has a gate electrically coupled to the third switch, and a source or a drain of the first transistor is coupled to the first resistance element and the first switch.

(4)

The electric current control circuit described in any one of (1) to (3), in which the second transistor has a gate electrically coupled to the fourth switch, and a source or a drain of the second transistor is coupled to the second resistance element and the second switch.

(5)

The electric current control circuit described in any one of (1) to (4), in which the third switch is configured to electrically couple the outputter and the gate of the first transistor, and the fourth switch is configured to electrically couple the outputter and the gate of the second transistor.

(6)

The electric current control circuit described in any one of (1) to (5), further including a digital-analog converter, in which the amplifier is configured to output a voltage based on a voltage to be inputted from the digital-analog converter to the first inputter.

(7)

The electric current control circuit described in any one of (1) to (6), in which the first transistor is configured to supply an electric current based on a voltage to be inputted to the first inputter and a resistance value of the first resistance element, and the second transistor is configured to supply an electric current based on a voltage to be inputted to the first inputter and a resistance value of the second resistance element.

(8)

The electric current control circuit described in any one of (1) to (7), in which the first resistance element and the second resistance element have resistance values different from each other.

(9)

The electric current control circuit described in any one of (1) to (8), further including a light emitting element electrically coupled to the first terminal.

(10)

The electric current control circuit described in any one of (1) to (9), further including:

a third resistance element and a fourth resistance element;

a fifth switch provided between the third resistance element and the second inputter;

a sixth switch provided between the fourth resistance element and the second inputter;

a seventh switch and an eighth switch electrically coupled to the outputter;

a third transistor provided between the third resistance element and the first terminal, the third transistor being to be inputted with an output voltage of the outputter via the seventh switch; and a fourth transistor provided between the fourth resistance element and the first terminal, the fourth transistor being to be inputted with an output voltage of the outputter via the eighth switch.

(11)

A control device including:

a light emitting element; and an electric current control circuit configured to control supplying of an electric current to the light emitting element, in which the electric current control circuit includes:

an amplifier including a first inputter, a second inputter, and an outputter;

a first resistance element and a second resistance element;

a first switch provided between the first resistance element and the second inputter;

a second switch provided between the second resistance element and the second inputter;

a third switch and a fourth switch electrically coupled to the outputter;

a first transistor provided between the first resistance element and the light emitting element, the first transistor being to be inputted with an output voltage of the outputter via the third switch; and a second transistor provided between the second resistance element and the light emitting element, the second transistor being to be inputted with an output voltage of the outputter via the fourth switch.

(12)

The control device described in (11), further including:

a third resistance element and a fourth resistance element;

a fifth switch provided between the third resistance element and the second inputter;

a sixth switch provided between the fourth resistance element and the second inputter;

a seventh switch and an eighth switch electrically coupled to the outputter;

a third transistor provided between the third resistance element and the light emitting element, the third transistor being to be inputted with an output voltage of the outputter via the seventh switch; and a fourth transistor provided between the fourth resistance element and the light emitting element, the fourth transistor being to be inputted with an output voltage of the outputter via the eighth switch.

(13)

A display device including:

a plurality of light emitting elements; and an electric current control circuit configured to control supplying of an electric current to the light emitting elements, in which the electric current control circuit includes:

an amplifier including a first inputter, a second inputter, and an outputter;

a first resistance element and a second resistance element;

a first switch provided between the first resistance element and the second inputter;

a second switch provided between the second resistance element and the second inputter;

a third switch and a fourth switch electrically coupled to the outputter;

a first transistor provided between the first resistance element and each of the light emitting elements, the first transistor being to be inputted with an output voltage of the outputter via the third switch; and a second transistor provided between the second resistance element and each of the light emitting elements, the second transistor being to be inputted with an output voltage of the outputter via the fourth switch.

(14)

The display device described in (13), further including:

a third resistance element and a fourth resistance element;

a fifth switch provided between the third resistance element and the second inputter;

a sixth switch provided between the fourth resistance element and the second inputter;

a seventh switch and an eighth switch electrically coupled to the outputter;

a third transistor provided between the third resistance element and each of the light emitting elements, the third transistor being to be inputted with an output voltage of the outputter via the seventh switch; and a fourth transistor provided between the fourth resistance element and each of the light emitting elements, the fourth transistor being to be inputted with an output voltage of the outputter via the eighth switch.

The present application claims the benefit of Japanese Priority Patent Application JP 2022-045967 filed with the Japan Patent Office on Mar. 22, 2022, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An electric current control circuit, comprising:

an amplifier including a first inputter, a second inputter, and an outputter;

a first resistance element;

a second resistance element;

a first switch;

a second switch;

a third switch;

a fourth switch, wherein each of the third switch and the fourth switch is electrically coupled to the outputter;

a first transistor between the first resistance element and a first terminal, wherein a first output voltage of the outputter is input into the first transistor based on a conducting state of the third switch, the first output voltage is input into the first transistor via the third switch, a first end of the first switch is coupled to the first resistance element and the first transistor, and a second end of the first switch is coupled to the second inputter; and a second transistor between the second resistance element and the first terminal, wherein a second output voltage of the outputter is input into the second transistor based on a conducting state of the fourth switch, the second output voltage is input into the second transistor via the fourth switch, a first end of the second switch is coupled to the second resistance element and the second transistor, and a second end of the second switch is coupled to the second inputter.

2. The electric current control circuit according to claim 1, wherein the first transistor is configured to supply a first electric current to the first terminal based on the first output voltage, and the second transistor is configured to supply a second electric current to the first terminal based on the second output voltage.

3. The electric current control circuit according to claim 1, wherein a gate of the first transistor is electrically coupled to the third switch, and one of a source of the first transistor or a drain of the first transistor is coupled to each of the first resistance element and the first switch.

4. The electric current control circuit according to claim 3, wherein a gate of the second transistor is electrically coupled to the fourth switch, and one of a source of the second transistor or a drain of the second transistor is coupled to each of the second resistance element and the second switch.

5. The electric current control circuit according to claim 4, wherein the third switch is configured to electrically couple the outputter and the gate of the first transistor, and the fourth switch is configured to electrically couple the outputter and the gate of the second transistor.

6. The electric current control circuit according to claim 1, further comprising:

a digital-analog converter, wherein the amplifier is configured to output a third voltage based on a fourth voltage, and the outputted third voltage is input to the first inputter.

7. The electric current control circuit according to claim 1, wherein the first transistor is configured to supply a third electric current based on a fifth voltage and a resistance value of the first resistance element, the fifth voltage is input to the first inputter, the second transistor is configured to supply a fourth electric current based on a sixth voltage and a resistance value of the second resistance element, and the sixth voltage is input to the first inputter.

8. The electric current control circuit according to claim 1, wherein a resistance value of the first resistance element is different from a resistance value of the second resistance element.

9. The electric current control circuit according to claim 1, further comprising a light emitting element electrically coupled to the first terminal.

10. The electric current control circuit according to claim 1, further comprising:

a third resistance element;

a fourth resistance element;

a fifth switch between the third resistance element and the second inputter;

a sixth switch between the fourth resistance element and the second inputter;

a seventh switch and an eighth switch electrically coupled to the outputter;

a third transistor between the third resistance element and the first terminal, wherein a seventh output voltage of the outputter is input to the third transistor based on a conducting state of the seventh switch, and the seventh output voltage is input into the third transistor via the seventh switch; and a fourth transistor between the fourth resistance element and the first terminal, wherein an eighth output voltage of the outputter is input to the fourth transistor based on a conducting state of the eighth switch, and the eighth output voltage is input into the fourth transistor via the eighth switch.

11. A control device, comprising:

a light emitting element; and an electric current control circuit configured to control supply of an electric current to the light emitting element, wherein the electric current control circuit includes:

an amplifier including a first inputter, a second inputter, and an outputter;

a first resistance element;

a second resistance element;

a first switch;

a second switch;

a third switch;

a fourth switch, wherein each of the third switch and the fourth switch is electrically coupled to the outputter;

a first transistor between the first resistance element and the light emitting element, wherein a first output voltage of the outputter is input into the first transistor based on a conducting state of the third switch, the first output voltage is input into the first transistor via the third switch, a first end of the first switch is coupled to the first resistance element and the first transistor, and a second end of the first switch is coupled to the second inputter; and a second transistor between the second resistance element and the light emitting element, wherein a second output voltage of the outputter is input into the second transistor based on a conducting state of the fourth switch, the second output voltage is input into the second transistor via the fourth switch, a first end of the second switch is coupled to the second resistance element and the second transistor, and a second end of the second switch is coupled to the second inputter.

12. The control device according to claim 11, further comprising:

a third resistance element;

a fourth resistance element;

a fifth switch between the third resistance element and the second inputter;

a sixth switch between the fourth resistance element and the second inputter;

a seventh switch electrically coupled to the outputter; and an eighth switch electrically coupled to the outputter;

a third transistor between the third resistance element and the light emitting element, wherein a third output voltage of the outputter is input to the third transistor based on a conducting state of the seventh switch, and the third output voltage is input into the third transistor via the seventh switch; and a fourth transistor between the fourth resistance element and the light emitting element, wherein a fourth output voltage of the outputter is input to the fourth transistor based on a conducting state of the eighth switch, and the fourth output voltage is input into the fourth transistor via the eighth switch.

13. A display device, comprising:

a plurality of light emitting elements; and an electric current control circuit configured to control supply of an electric current to the plurality of light emitting elements, wherein the electric current control circuit includes:

an amplifier including a first inputter, a second inputter, and an outputter;

a first resistance element and a second resistance element;

a first switch;

a second switch;

a third switch;

a fourth switch, wherein each of the third switch and the fourth switch is electrically coupled to the outputter;

a first transistor between the first resistance element and each of the plurality of light emitting elements, wherein a first output voltage of the outputter is input into the first transistor based on a conducting state of the third switch, the first output voltage is input into the first transistor via the third switch, a first end of the first switch is coupled to the first resistance element and the first transistor, and a second end of the first switch is coupled to the second inputter; and a second transistor between the second resistance element and each of the plurality of light emitting elements, wherein a second output voltage of the outputter is input into the second transistor based on a conducting state of the fourth switch, the second output voltage is input into the second transistor via the fourth switch, a first end of the second switch is coupled to the second resistance element and the second transistor, and a second end of the second switch is coupled to the second inputter.

14. The display device according to claim 13, further comprising:

a third resistance element;

a fourth resistance element;

a fifth switch between the third resistance element and the second inputter;

a sixth switch between the fourth resistance element and the second inputter, a seventh switch electrically coupled to the outputter;
an eighth switch electrically coupled to the outputter;
a third transistor between the third resistance element and each of the plurality of light emitting elements, wherein
a third output voltage of the outputter is input to the third transistor based on a conducting state of the seventh switch, and
the third output voltage is input into the third transistor via the seventh switch; and
a fourth transistor between the fourth resistance element and each of the plurality of light emitting elements, wherein
a fourth output voltage of the outputter is input to the fourth transistor based on a conducting state of the eighth switch, and
the fourth output voltage is input into the fourth transistor via the eighth switch.

* * * * *